US012127989B2

(12) United States Patent
Otten et al.

(10) Patent No.: US 12,127,989 B2
(45) Date of Patent: Oct. 29, 2024

(54) SYSTEM FOR ASSISTING MUSCLE STRENGTH (71) Applicant: EXOIQ GMBH, Bohlsen (DE)

(72) Inventors: Bernward Otten, Hamburg (DE); Robert Weidner, Bohlsen (DE); Jens Peter Wulfsberg, Norderbrarup (DE)

(73) Assignee: EXOIQ GMBH, Hamburg (DE)

( * ) Notice: Subject to any disclaimer, the term of this patent is extended or adjusted under 35 U.S.C. 154(b) by 905 days.

(21) Appl. No.: 16/754,709

(22) PCT Filed: Aug. 19, 2018

(86) PCT No.: PCT/EP2018/072375
§ 371 (c)(1),
(2) Date: Apr. 8, 2020

(87) PCT Pub. No.: WO2019/072444
PCT Pub. Date: Apr. 18, 2019

(65) Prior Publication Data
US 2023/0190565 A1 Jun. 22, 2023

(30) Foreign Application Priority Data
Oct. 10, 2017 (DE) .................... 10 2017 123 574.4

(51) Int. Cl.
A61H 1/02 (2006.01)
B25J 9/00 (2006.01)

(52) U.S. Cl.
CPC ......... A61H 1/0281 (2013.01); A61H 1/0244 (2013.01); A61H 1/0274 (2013.01);
(Continued)

(58) Field of Classification Search
CPC ...... A61H 1/0274–0288; A61H 1/0237–0244; A61H 2201/0153; A61H 2201/165; A61H 2201/5061; A61H 2201/5064; A61H 2201/5097; A61H 2201/5084; B25J 9/0006
(Continued)

(56) References Cited

U.S. PATENT DOCUMENTS 9,266,233 B2 * 2/2016 Kornbluh ............... B25J 9/0006
9,427,865 B2 * 8/2016 Doyle .................... F16M 13/04
(Continued)

FOREIGN PATENT DOCUMENTS

WO  WO-2017093651 A1 * 6/2017  ............ B25J 9/0006
WO  2017/127683 A1  7/2017
WO  2014/195373 A1  12/2017

OTHER PUBLICATIONS

Definition of "wireless" from Merriam-Webster Online Dictionary. <https://www.merriam-webster.com/dictionary/wireless>. Accessed on Apr. 26, 2023. (Year: 2023).*
(Continued)

Primary Examiner — Valerie L Woodward
Assistant Examiner — Paige Kathleen Bugg
(74) Attorney, Agent, or Firm — Workman Nydegger (57) ABSTRACT Provided is a system for muscle strength support. The system includes an exoskeleton which is configured to be attached to a body of a human during use of the system, and a control unit for controlling a supportive force provided by the exoskeleton during use of the system.

17 Claims, 11 Drawing Sheets (52) U.S. Cl.
CPC ..... *B25J 9/0006* (2013.01); *A61H 2201/0153* (2013.01); *A61H 2201/1207* (2013.01); *A61H 2201/165* (2013.01); *A61H 2201/503* (2013.01); *A61H 2201/5061* (2013.01); *A61H 2201/5064* (2013.01); *A61H 2201/5079* (2013.01); *A61H 2201/5084* (2013.01); *A61H 2201/5097* (2013.01)

(58) Field of Classification Search
USPC .......................................................... 601/5
See application file for complete search history.

(56) References Cited

U.S. PATENT DOCUMENTS

| | | | |
|---|---|---|---|
| 9,943,458 B2* | 4/2018 | Tanaka | A61F 5/0125 |
| 2006/0114120 A1* | 6/2006 | Goldstone | G08C 17/02 |
| | | | 340/13.24 |
| 2009/0210093 A1 | 8/2009 | Jacobsen et al. | |
| 2012/0186019 A1* | 7/2012 | Rawls-Meehan | A47C 21/04 |
| | | | 5/616 |
| 2015/0351991 A1* | 12/2015 | Amundson | A61H 1/0244 |
| | | | 623/24 |
| 2016/0031076 A1* | 2/2016 | Garrett | A61H 1/024 |
| | | | 901/1 |
| 2017/0119132 A1* | 5/2017 | Pruess | F16M 11/2007 |

OTHER PUBLICATIONS

Markus Hessinger et al., *Hybrid Position/Force Control of an Upper-Limb Exoskeleton for Assisted Drilling*, 2017 IEEE/RSJ International Conference on Intelligent Robots and Systems, Sep. 24, 2017, XP033266148, pp. 1824-1829.

International Search Report and Written Opinion dated Apr. 2, 2019, issued in PCT Application No. PCT/EP2018/072375 filed Aug. 19, 2018.

International Search Report and Written Opinion dated Dec. 10, 2018, issued in PCT Application No. PCT/EP2018/072375 filed Aug. 19, 2018.

* cited by examiner

SYSTEM FOR ASSISTING MUSCLE STRENGTH

FIELD

The present invention relates to a system for muscle strength support. In particular, the present invention relates to a system which enables the provided supportive force to be adjusted while the system is in use.

BACKGROUND

Numerous technical systems are known from the prior art, which allow human movements to be supported. The support can, for example, be aimed at improving the quality of manual work steps, workplace ergonomics or the mobility of people with musculoskeletal disorders. Said systems address either the whole body or parts of the body, for example the lower extremities, the upper extremities or the back, and are often based on exoskeletons.

SUMMARY OF THE DISCLOSURE

However, exoskeletons must be individually adapted to the respective user and the task to be performed in order to be able to develop their full potential. In addition to taking anthropometry into account, it is particularly important to adapt the supportive force provided during use of the system to the actual need, as the actual need depends on a variety of aspects, such as, for example, the tool weight, the body position, the duration of the activity and of course the physiological abilities (particularly the strength characteristics during the movements). Also important is the right moment and the duration of the support, since too much support in natural and healthy load cases can lead to muscle loss.

In this regard, the invention enriches the prior art as control of the supportive force provided by the exoskeleton can be exercised during use of the system without stopping or aborting an activity, for the accomplishment of which the supportive force is provided, as control elements/sensors of a control unit are arranged in contact with the hand or within finger's reach and/or the control unit enables an automated adjustment of the supportive force on the basis of data relating to tool use.

A first system for muscle strength support according to the invention comprises an exoskeleton which is configured to be attached to a body of a human during use of the system, and a tool which is configured to be guided by the human during use of the system, wherein the tool has a control unit for controlling a supportive force provided by the exoskeleton during use of the system.

The term "exoskeleton", as used throughout the description and the claims, is to be understood in particular as a structure formed by a plurality of rigid components, which provides a support, holding or force transmission function with regard to the human body. Furthermore, the term "attached", as used throughout the description and the claims, particularly refers to a contact in which forces acting on the arms and/or the spinal column can be redirected, for instance, as the system rests on or (partially) encloses or embraces the arm/shoulder/chest and the hip/pubic area.

In addition, the term "tool", as used throughout the description and the claims, is to be understood in particular as a device which is configured to be held in one or both hands by the user when performing an activity (i.e., acting on an object or a living being). Furthermore, the term "control unit", as used throughout the description and the claims, is to be understood in particular as a microcontroller or a circuit which is configured to generate control commands on the basis of sensor signals, wherein the control commands control the state or the behavior of the exoskeleton.

Preferably, the control unit is connected with a sensor unit for measuring a relative position, a relative orientation, a relative velocity, and/or a relative acceleration of the tool with respect to the exoskeleton, and/or a position, an orientation, a velocity and/or an acceleration of the tool in a stationary coordinate system, and the supportive force is controlled based on the measured values.

By determining the position, the orientation, the velocity and/or the acceleration of the tool, the position and orientation of the arm or arms, as well as the (expected) load on the arm or arms and (through continuous monitoring) the duration of the activity can be determined and the supportive force can be adjusted accordingly. For instance, the supportive force can be increased in the course of the activity, or the supportive force can be temporarily increased when taking certain positions and/or orientations in order to avoid overloading.

Preferably, the control unit is configured to control the supportive force while the tool is in use, particularly when an engine of the tool is in operation.

The supportive force can thus be reduced during work breaks in which no movements causing overload are to be expected.

Preferably, the control unit has a force sensor and the supportive force is controlled based on measurement values of the force sensor.

In this way, impending overload scenarios can be identified and avoided.

Preferably, the force sensor is integrated in a button and the supportive force is controlled based on the measurement values of the force sensor when the button is pressed.

As a result, for instance, the force exerted by the user when guiding the tool can be determined, which allows detecting and damping tension peaks by providing additional supportive force. In addition, the button can also be actively used by the user to, depending on the situation, temporarily demand a higher supportive force.

Preferably, the control unit is configured to monitor an operating state of the tool and to control the supportive force based on the operating state.

As a result, tension peaks resulting from (incorrect) operation of the tool can be detected and damped.

Preferably, the control unit is configured to control the supportive force based on a power consumption of the tool and/or forces generated by the tool.

For instance, the supportive force can also be increased when the power consumption is increased, since the increase in the power consumption presumably increases the reactive forces.

Preferably, the control unit is configured to transmit control signals for controlling the supportive force to the exoskeleton by radio.

As a result, the exoskeleton can be used more easily in combination with various tools. In addition, potentially annoying cables can be avoided when using the exoskeleton.

Preferably, the exoskeleton is configured to transmit a switch-on signal to the tool if the state of the exoskeleton meets one or more first conditions and/or to transmit a switch-off signal to the tool if the state of the exoskeleton meets one or more second conditions.

For instance, the switch-on signal can be transmitted when the exoskeleton is in a pose in which a sudden force shock can be absorbed by the exoskeleton and does not lead to an overload on part of the user. Furthermore, the switch-off signal can be transmitted to the tool when the exoskeleton reaches a support limit in order to prevent an overload associated with exceeding the support limit.

A second system for muscular strength support according to the invention comprises an exoskeleton, which is configured to be attached to the body of a human during the use of the system and a control unit for controlling a supportive force provided by the exoskeleton during use of the system, and a control unit, wherein the control unit has a force sensor for arrangement on a palm or a human finger and the supportive force is controlled based on measurement values of the force sensor.

A first method according to the invention for supporting muscle strength comprises attaching an exoskeleton to the body of a human and guiding, by the human, a tool, and transmitting signals for controlling the supportive force provided by the exoskeleton, from the tool to a drive control or a drive of the exoskeleton.

A second method according to the invention for supporting muscle strength comprises attaching an exoskeleton to the body of a human and controlling a supportive force provided by the exoskeleton based on signals from a force sensor arranged on a palm or a finger of the human.

Furthermore, all the features (of preferred embodiments) of the systems according to the invention can also be features (preferred embodiments) of the methods according to the invention which relate to the use of systems according to the invention, and vice versa.

BRIEF DESCRIPTION OF THE DRAWINGS

The invention will be explained in more detail in the detailed description on the basis of exemplary embodiments, wherein reference is made to the drawings in which:

FIG. 6b shows a possible use of the modified control unit shown in FIG. 6a;

FIG. 6c shows another possible use of the modified control unit shown in FIG. 6a;

FIG. 8b shows a possible use of the modified control unit shown in FIG. 8a;

FIG. 9a shows another possible modification of the control units shown in FIGS. 1-8a;

FIG. 9b shows a possible use of the modified control unit shown in FIG. 9a;

In the drawings, the same and functionally similar elements are indicated by the same (or similar) reference numerals. However, it is to be noted that not all elements are necessarily shown in all drawings and that the elements shown are not necessarily drawn to scale.

DETAILED DESCRIPTION

Figure 1:
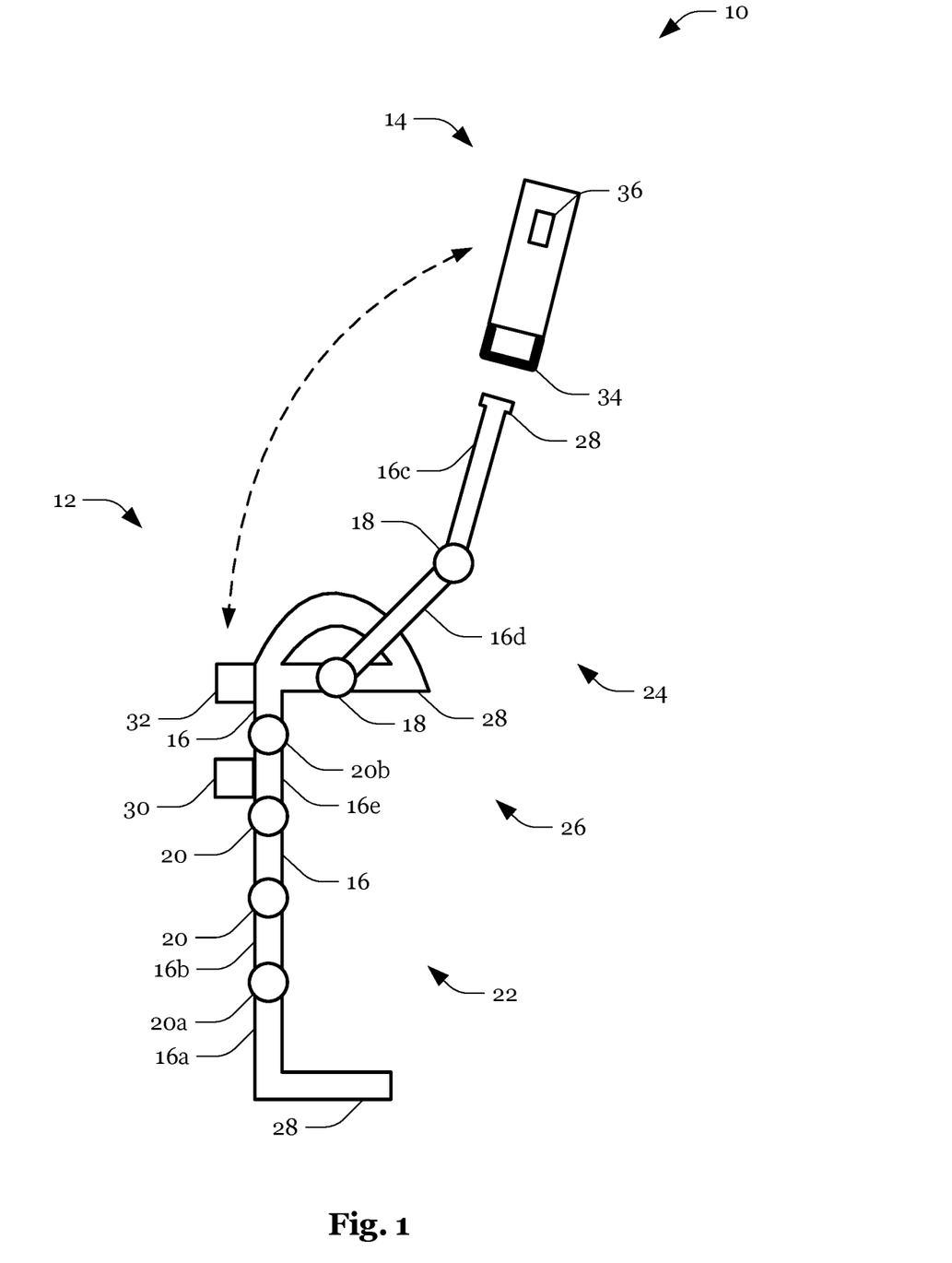
FIG. 1 shows a schematic view of a first system according to the invention, according to an exemplary embodiment.

FIG. 1 shows a system 10 comprising an exoskeleton 12 and a tool 14. The exoskeleton 12 has a plurality of serially connected rigid components 16. The rigid components 16 are interconnected by connecting elements, such as, for example, joints 18 or guides 20. The exoskeleton 12 can be divided into several sections which replicate sections of the human body in regard to their mobility. The exoskeleton 12 shown in FIG. 1 is subdivided, for example, into a base section 22 and an arm section 24, which are connected to one another by a shoulder section 26.

The base section 22 comprises a first exoskeleton component 16a with a guide 20a, which is configured to guide a second exoskeleton component 16b of the base section 22 along a curved trajectory relative to the first exoskeleton component 16a. For instance, the exoskeleton components 16 of the base section 22 can replicate, in their movement, one or more vertebrae of a user (not shown). The exoskeleton 12 may also include one or more sensors (e.g., potentiometers, rotation rate/acceleration sensors, receivers for receiving signals for triangulation, etc.) for determining the absolute/relative positions/orientations of the exoskeleton components 16 of the base section 22.

The arm section 24 comprises a third exoskeleton component 16c, which is articulatedly connected to a fourth exoskeleton component 16d. For instance, the movement of the exoskeleton components 16 of the arm section 24 can replicate the movement of the upper and lower arm of the user. Furthermore, an exoskeleton component 16d of the arm section 24 is articulated to the shoulder section 26, which in turn is connected to an exoskeleton component 16e of the base section 22 by a guide 20b. The exoskeleton 12 may also include one or more sensors (e.g., potentiometers, rotation rate/acceleration sensors, etc.) for determining the absolute/relative positions/orientations of the exoskeleton components 16 of the arm section 24.

Base section 22, arm section 24 and shoulder section 26 each have one or more rigid or flexible attachment elements 28 (for example straps) which contact the hip/pubic area or on the arm/shoulder/chest area of the user or embrace or enclose it (partially). The attachment elements 28 are typically adjustable (to different users) by adapting their relative position to one another or by adjusting their circumference. The shoulder section 26 can further comprise one or more sensors (for example potentiometers, rotation rate/acceleration sensors etc.) for determining the relative positions/orientations of the base section 22 and the arm section 24 to one another.

The exoskeleton 12 further comprises a drive 30 with a power supply connector or an energy store (for example one or more primary or secondary cells or one or more tanks for compressed air) and a drive control 32 which are configured to control the position of some or all of the rigid exoskeleton components 16 relative to each other, whereby a support, holding or force transmission function can be performed with respect to the human body of the user. The drive 30 can comprise, for example, one or more electric motors (possibly in combination with ties) or valves (in combination with pneumatic cylinders), wherein their force exertion or state is controlled by the drive control 32.

The tool 14 can be used by the user of the exoskeleton 12 to perform an activity (for example, acting on an object), during which the tool 14 is held in one or both hands of the user and guided by the user. The tool 14 comprises one or more handles 34 (for example one or more round sections provided with a flexible material, such as for example a rubberized pistol grip) for guiding the tool 14 and a control unit 36 which is configured to transmit control commands regarding the state or the behavior of the exoskeleton 12 and in particular regarding the supportive force provided by the exoskeleton 12 to the drive control 32 or the drive or drives 30 of the exoskeleton 12.

The handle 34 of the tool 14 can be provided with one or more control elements 44 which can be actuated by the fingers of the user when guiding the tool 14, for example, a button and/or a switch. For instance, the power consumption or a speed of a tool element or an operating mode of the tool 14 can be controlled by actuating the control elements 44. For example, the handle 34 can have a button that can be pushed into the handle 34, wherein the tool 14 is controlled by pressing the button.

As shown in FIG. 1, the tool 14 can be designed as a device that can be operated independently of the exoskeleton 12 and can have, for example, its own energy supply (which may comprise one or more primary or secondary cells or a power supply connection). In particular, the tool 14 can be free of mechanical connections to the exoskeleton 12, so that it can be guided relative to the exoskeleton 12 by the user without a mechanical restriction. Alternatively, the tool 14 can be mechanically coupled to the exoskeleton 12, for example by a passive or active joint 18 or a passive or active guide 20.

Figure 1A:
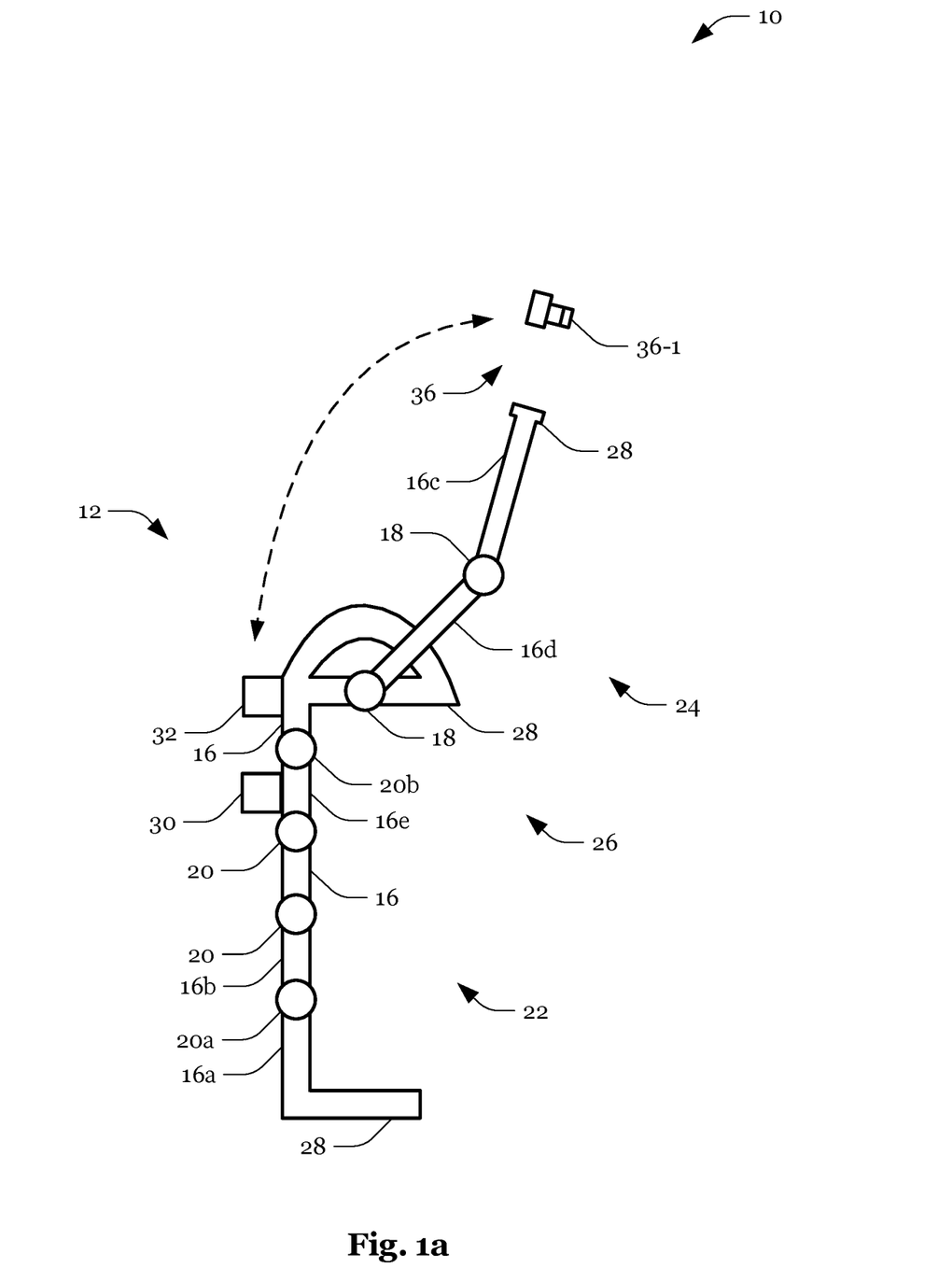
FIG. 1a shows a schematic view of a modification of the first system according to the invention, according to an exemplary embodiment.

FIG. 1a shows a modification of the system 10 shown in FIG. 1, which differs from the system 10 shown in FIG. 1 in that the system 10 has a force sensor 36-1 instead of or in addition to the tool 14, which is provided for arrangement on a palm or a finger of the human, and the supportive force 48 is controlled on the basis of measurement values of the force sensor 36-1. For instance, the force sensor 36-1 can be affixed to a flexible material which can be put over a finger or the hand of the user (e.g. a glove).

Figure 2:
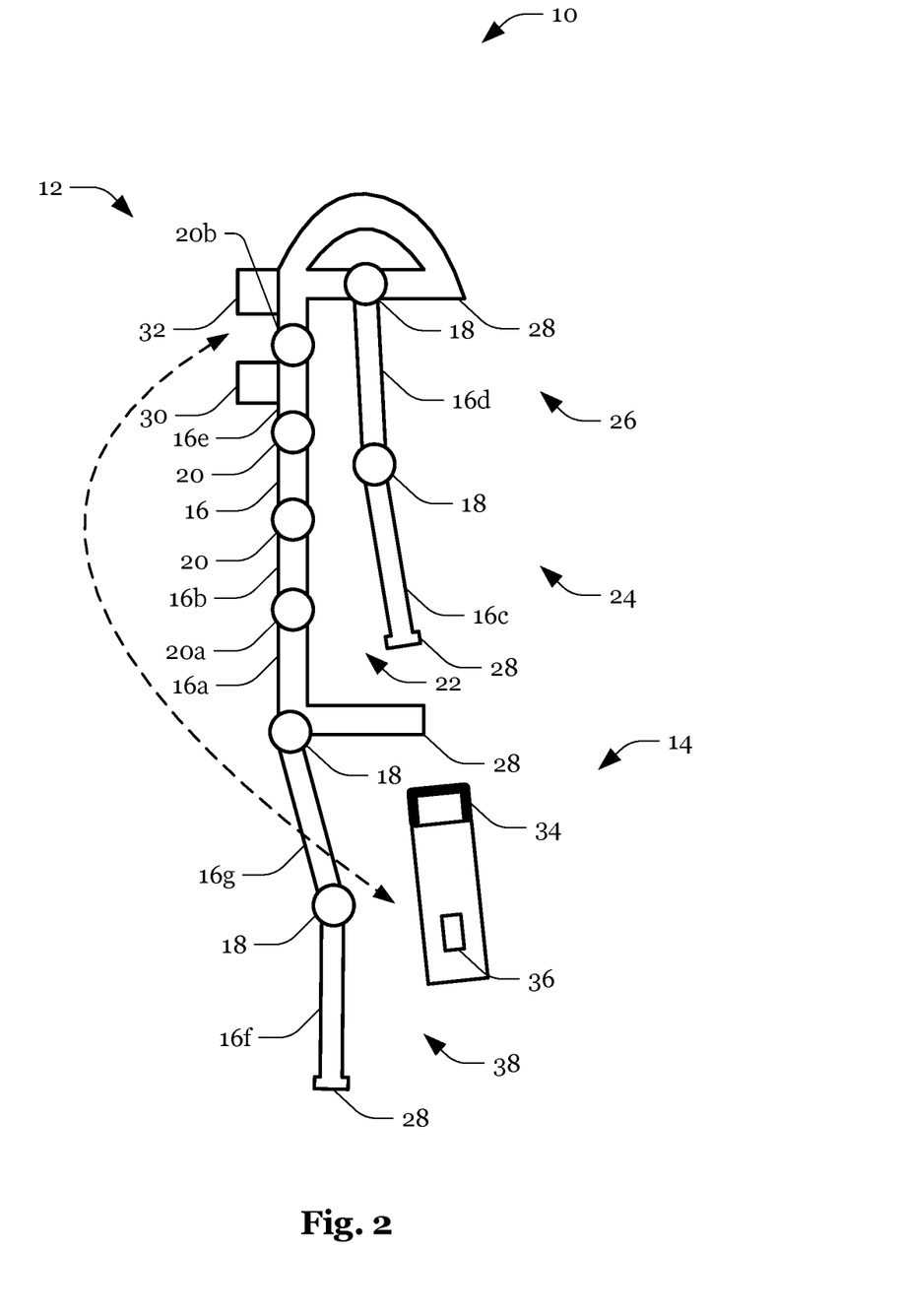
FIG. 2 shows a schematic view of a second system according to the invention, according to another exemplary embodiment.
Figure 2A:
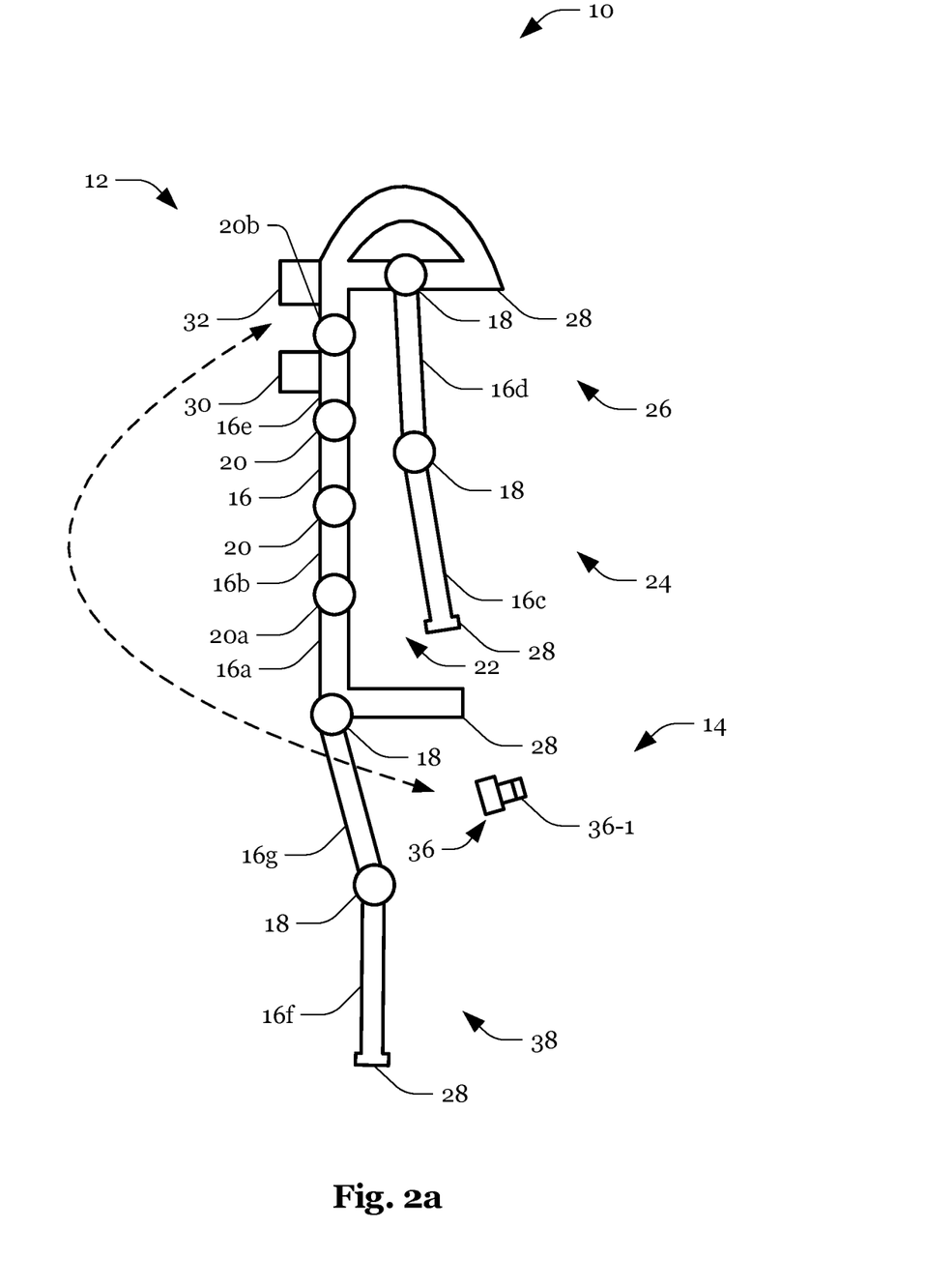
FIG. 2a shows a schematic view of a modification of the second system according to the invention, according to an exemplary embodiment.

FIGS. 2 and 2a show modifications of the systems 10 shown in FIGS. 1 and 1a, which differ from the systems 10 shown in FIGS. 1 and 1a in that the exoskeleton 12 additionally comprises a leg section 38. The leg section 38 comprises a fifth exoskeleton component 16f, which is articulatedly connected to a sixth exoskeleton component 16g. For instance, the movement of the exoskeleton components 16 of the leg section 38 can replicate the movement of the upper and lower leg of the user. Furthermore, an exoskeleton component 16g of the leg section 38 is articulatedly connected to the base section 22. The exoskeleton 12 may also include one or more sensors for determining the absolute/relative positions/orientations of the exoskeleton components 16 of the leg section 38.

Although not shown, the exoskeletons 12 shown in FIGS. 1, 1a, 2 and 2a may also comprise a head section and the exoskeletons 12 may further comprise one or more sensors (for example potentiometers, rotation rate/acceleration sensors, etc.) for determining the absolute/relative positions/orientations of the exoskeleton components of the head section. The sensor or sensors of the exoskeleton 12 can then be used for a partial or complete determination of the pose of the exoskeleton 12 or of the user, wherein the data relating to the determined pose can be taken into account in regard to the adjustment of the support force together with the control commands.

Furthermore, the pose data can be used to turn tool 14 off in situations where a user has taken an improper pose or is in danger of losing control over the tool 14. Furthermore, the data regarding the pose can be used to allow activation of the tool 14 only if there is no risk of overloading the exoskeleton 12 or the user, or to deactivate the tool 14 when there is a risk of overloading the exoskeleton 12 or the user.

Figure 3A:
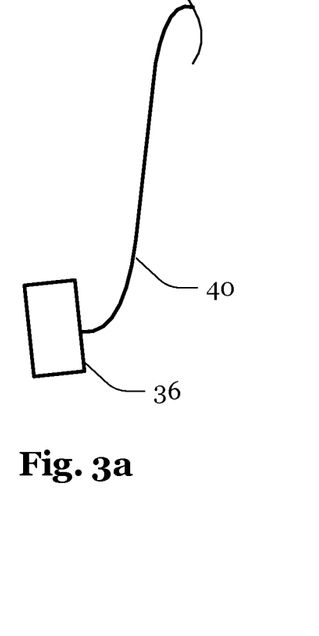
FIG. 3a shows a schematic view of a control unit according to an exemplary embodiment.
Figure 3B:
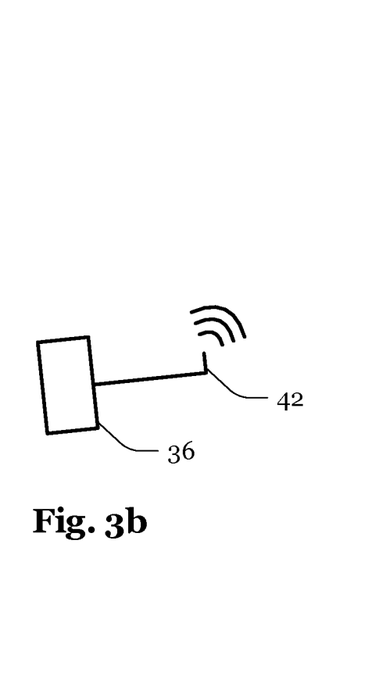
FIG. 3b shows a schematic view of a control unit according to another exemplary embodiment.

As shown in FIGS. 3a and 3b, the control commands can be transmitted by wire or wireless (for example via Bluetooth Low Energy) to the drive control 32 of the exoskeleton 12. For instance, the control unit 36 may comprise a data interface for connecting a data cable 40 or an antenna 42. Furthermore, in order to increase the reliability and to detect transmission errors, there may be several interfaces, cables 40 or antennas 42 instead of one interface and one cable 40 or one antenna 42. In addition, a number of interfaces and cables 40 may be provided in order to be able to use a number of tools 14 in parallel or alternately without having to change the cables 40.

Figure 4:
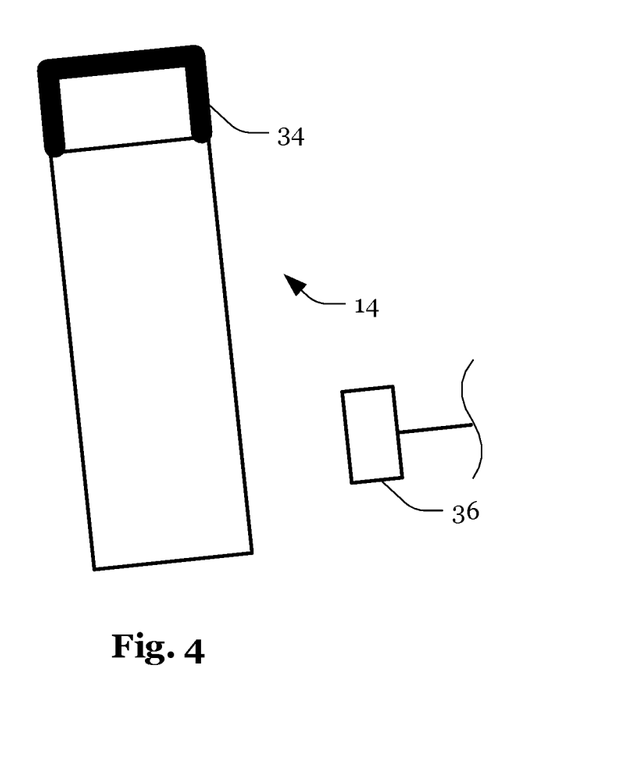
FIG. 4 shows a schematic view of a tool and a control unit that can be connected with the tool.

As shown in FIG. 4, the control unit 36 can be detachable from the tool 14. For instance, the control unit 36 can be connected to the housing of the tool 14 before use (for instance, pushed in or snapped on) and removed from the housing of the tool 14 after use. Furthermore, the tool 14 may have an interface through which the control unit 36 can be supplied with energy and tool data. For instance, one or more control units 36 may be associated with a particular exoskeleton 12 or user (and may have control commands tailored to the exoskeleton 12 or the user or may have a configuration tailored to the exoskeleton 12 or the user).

Figure 5A:
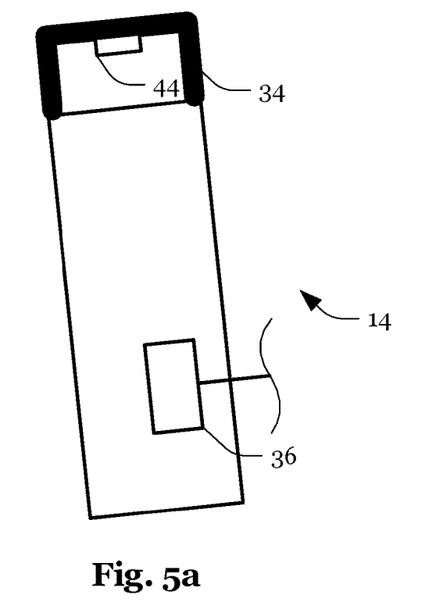
FIG. 5a shows a possible modification of the control units shown in FIGS. 1-4.
Figure 5B:
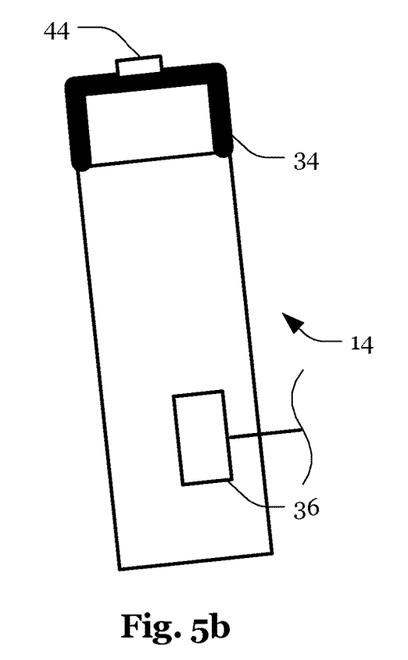
FIG. 5b shows another possible modification of the control units shown in FIGS. 1-4.

FIGS. 5a and 5b show control elements 44 of the control unit 36 arranged on the handle 34 of the tool, for instance buttons with an integrated force sensor. The control elements 44 may be self-adhesive and can therefore be attached in a position which is appropriate for the user. For instance, a control element 44 can be arranged on the handle 34, as shown in FIG. 5a, in such a way that it can be actuated with one or more fingers when guiding the tool 14. Furthermore, a control element 44 can be arranged on the handle 34, as shown in FIG. 5b, in such a way that it can be actuated with the palm of the hand when the tool 14 is being guided.

Figure 5C:
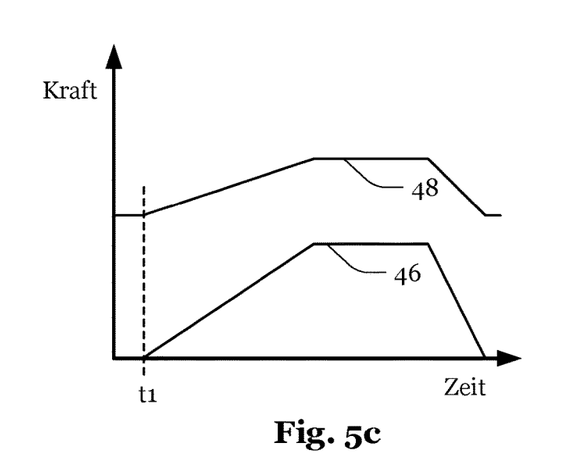
FIG. 5c shows a possible use of the modified control units shown in FIGS. 5a and 5b.

FIG. 5c illustrates an example of a possible use of the controls 44 shown in FIGS. 5a and 5b when they are configured as a button with an integrated force sensor. The actuating force 46 is measured and a supportive force 48 provided by the exoskeleton 12 is adjusted based on the measured actuating force 46. At instant t1 before the button is pressed, the exoskeleton 12 provides a supportive force 48

(which can be zero) which is increased by pressing the button as a function of the actuating force 46.

The increase in the supportive force 48 can be caused, for example, by means of an enlargement factor coded in the control commands. Alternatively, the increase in the supportive force 48 can be brought about by transmitting an indicator with regard to the measured actuating force 46, wherein the increase in the supportive force 48 is caused by the drive control 32, based on the received data. Furthermore, the increase in the supportive force 48 may depend on whether the measured actuating force 46 exceeds a specific threshold value or the increase in the supportive force 48 may be omitted if the measured actuating force 46 does not exceed a specific threshold value.

Figure 6A:
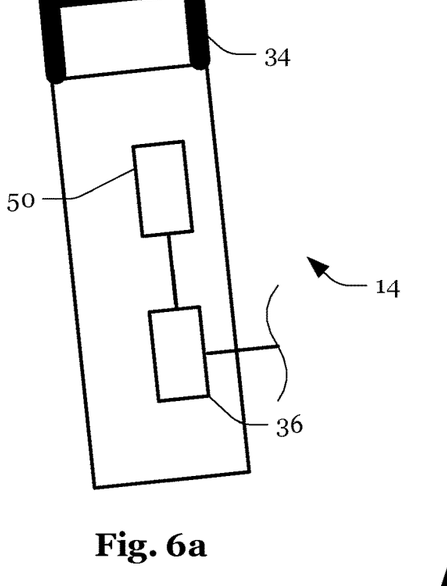
FIG. 6a shows another possible modification of the control units shown in FIGS. 1-4.

FIG. 6a shows a sensor unit 50 connected to an interface of the control unit 36, which allows the position and/or orientation of the tool 14 to be tracked relative to a (earth-fixed) coordinate system (e.g., WGS84), for instance, by using a sensor data fusion algorithm (e.g., a Kalman filter algorithm, etc.). The sensor unit 50 may, as shown in FIG. 6a, be integrated in the tool 14 or fastened to the tool 14 (an inertial measuring unit, for example), or be arranged at a distance from the tool 14 (a (stereo) camera system, for example).

Figures 6B, 6C:
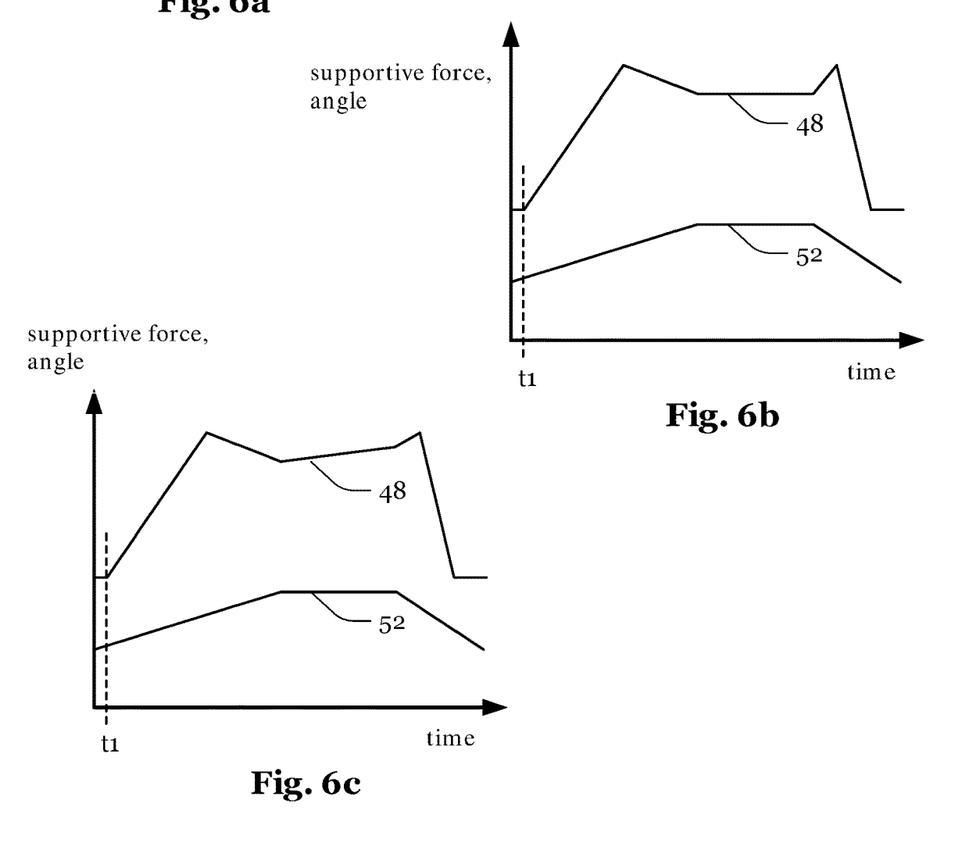

FIG. 6b illustrates by way of an example a possible use of the sensor unit 50 shown in FIG. 6a during an activity that is to be carried out above the head of the user, in which a tool axis is to be aligned vertically. An angle 52 between the tool axis and the horizontal is measured or calculated from the sensor data, which allows determining when the user picks the tool 14 or whether the user is working overhead. This allows adapting the supportive force 48 when the tool 14 is picked up at the time t1 as a function of the orientation of the tool 14.

As shown in FIG. 6b, the supportive force 48 can first be increased with increasing angle and then reduced again, wherein a maximum of the supportive force 48 is provided at an angle below 90°, i.e., when the tool 14 is swung up. Furthermore, as shown in FIG. 6c, the supportive force 48 may be adjusted depending on the period of use of the tool 14, i.e. increased as the period of use of the tool 14 increases, in order to compensate for a fatigue effect on the part of the user.

Figures 7A, 7B, 7C:
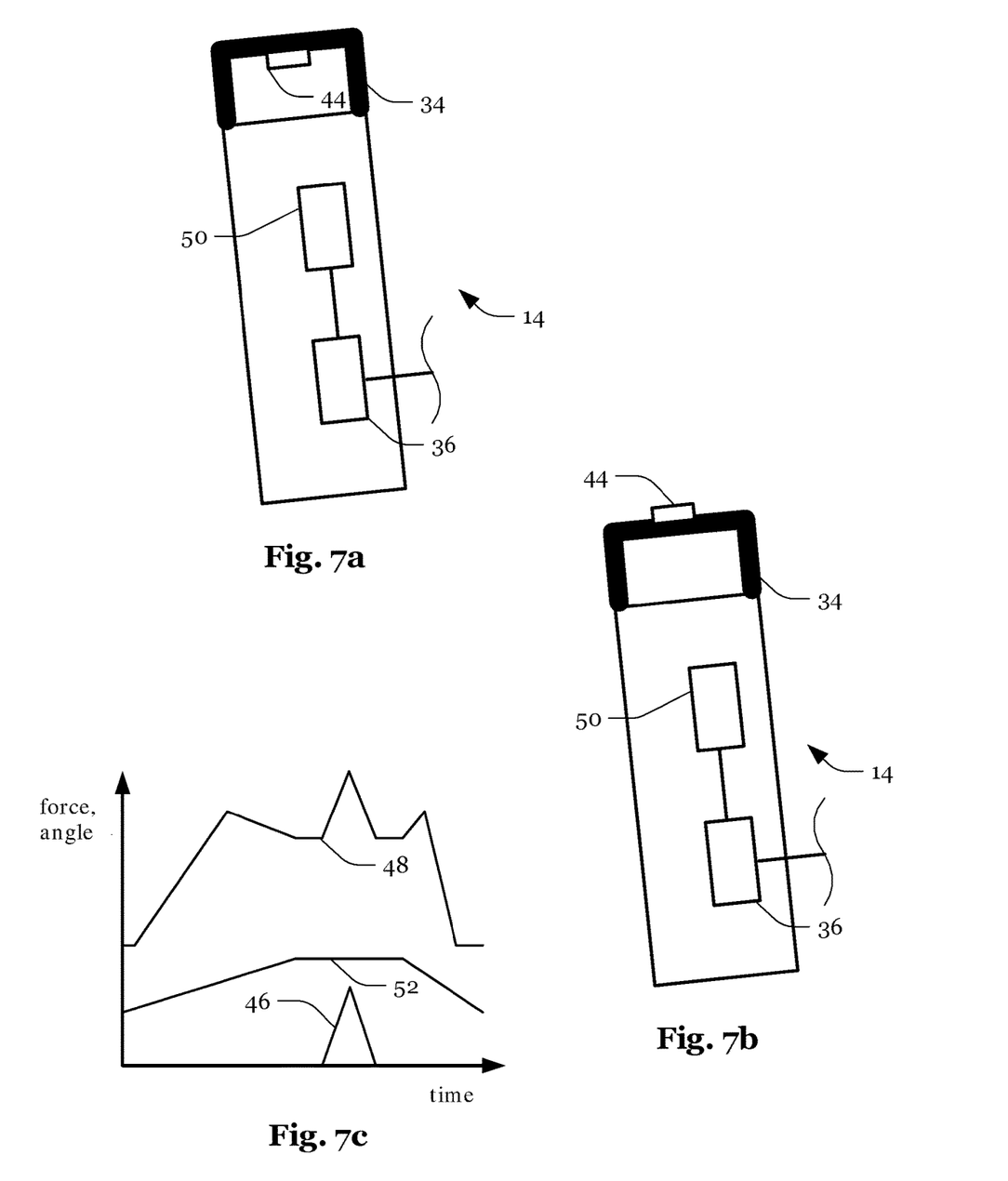
FIG. 7a shows another possible modification of the control units shown in FIGS. 1-4.
FIG. 7b shows another possible modification of the control units shown in FIGS. 1-4.
FIG. 7c shows a possible use of the modified control units shown in FIGS. 7a and 7b.

As shown in FIGS. 7a and 7b, the control elements 44 shown in FIGS. 5a and 5b can be combined with the sensor unit 50 shown in FIG. 6a. For example, as shown in FIG. 7c, the supportive force 48 may be adjusted based on the measured/calculated position and/or orientation of the tool 14 and the actuation of a control element 44, wherein additional supportive force 48 is provided by actuating the control element 44.

In addition to the possible combinations shown, a large number of further possible combinations can be envisaged, and it can be further envisaged that the user may choose from different operating modes as needed. For instance, in a further or alternative operating mode, the supportive force 48 can be adjusted based on the measured/calculated position and/or orientation of the tool 14 when the control element 44 is not actuated and based on the actuation of a control element 44 when the control element 44 is actuated.

Figure 8A:
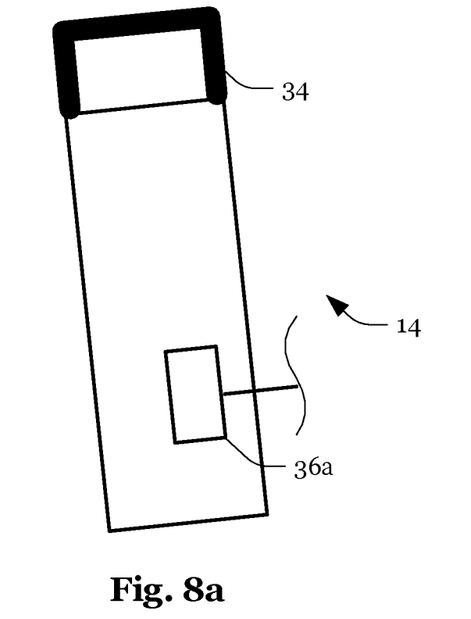
FIG. 8a shows another possible modification of the control units shown in FIGS. 1-7b.
Figure 8B:
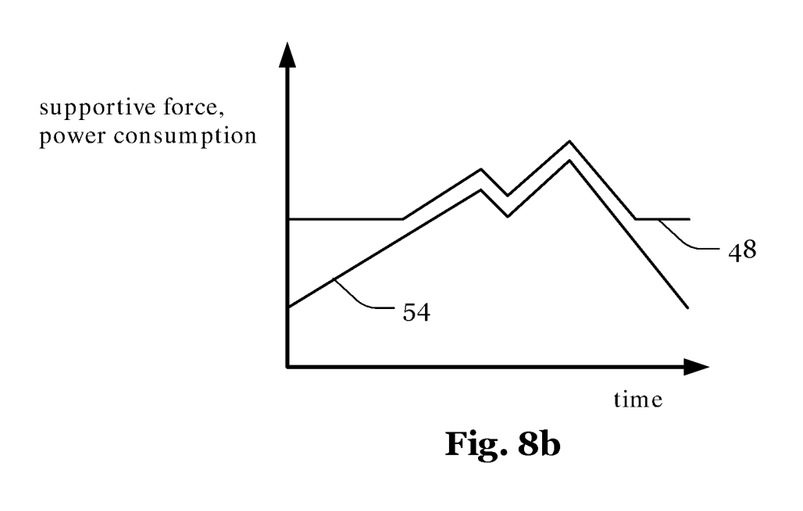

In addition, as shown in FIGS. 8a and 8b, operating state parameters such as, for example, the power consumption 54 (or a contact pressure, torque, etc.) of the tool 14 can be monitored by the control unit 36a and be taken into account in the adjustment of the supportive force 48. As shown in FIG. 8b, the supportive force 48 can be increased as a function of the power consumption 54 once a power consumption threshold is exceeded. The adaptation of the supportive force 48 as a function of one or more operating state parameters, such as the power consumption 54, may represent an independent operating mode or can be combined with any of the preceding factors (to form a rule-based control algorithm, for example).

Figure 9A:
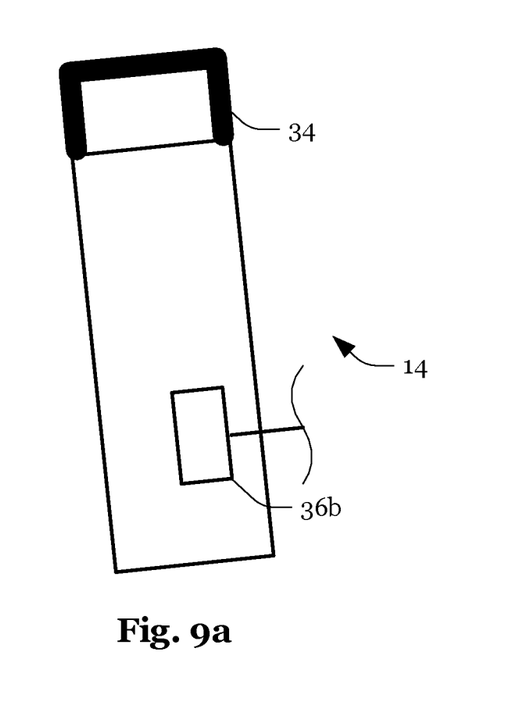
Figure 9B:
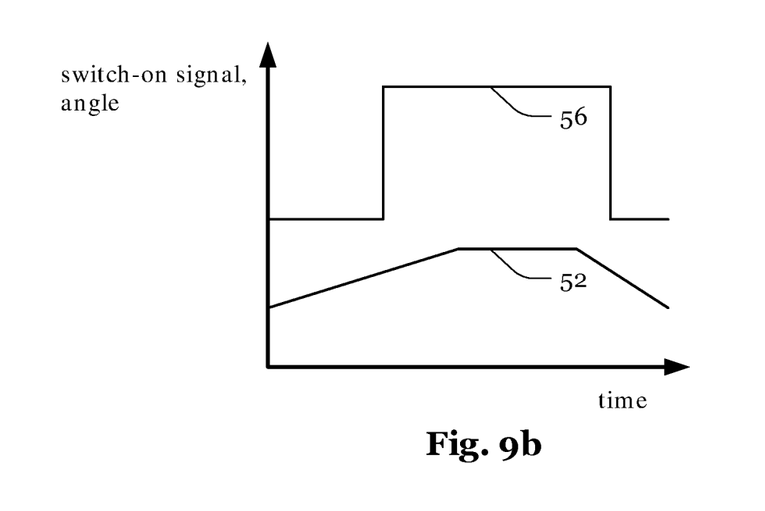

In particular, as shown in FIGS. 9a and 9b, operating state parameters, such as the position and/or orientation of the tool 14 (possibly in combination with data relating to the pose), can be used to prevent an (accidental) activation the tool 14 or to automatically activate the tool when the tool 14 is in a certain position and/or in a certain orientation (and the exoskeleton 12 is in a pose desired for performing the activity).

For instance, the control unit 36b can receive data regarding the pose of the exoskeleton 12 and can generate the switch-on signal 56 based on the received data if a desired pose has been assumed. Alternatively, the control unit 36b can be configured to receive a switch-on signal 56 when the desired pose has been adopted. If the switch-on signal 56 is present and the tool 14 is in a specific position and/or in a specific orientation, the control unit 36b can automatically activate the tool 14 or release the tool 14 for manual activation. Furthermore, the tool 14 can be switched off automatically when one of the conditions necessary for activation is no longer present.

Figure 10:
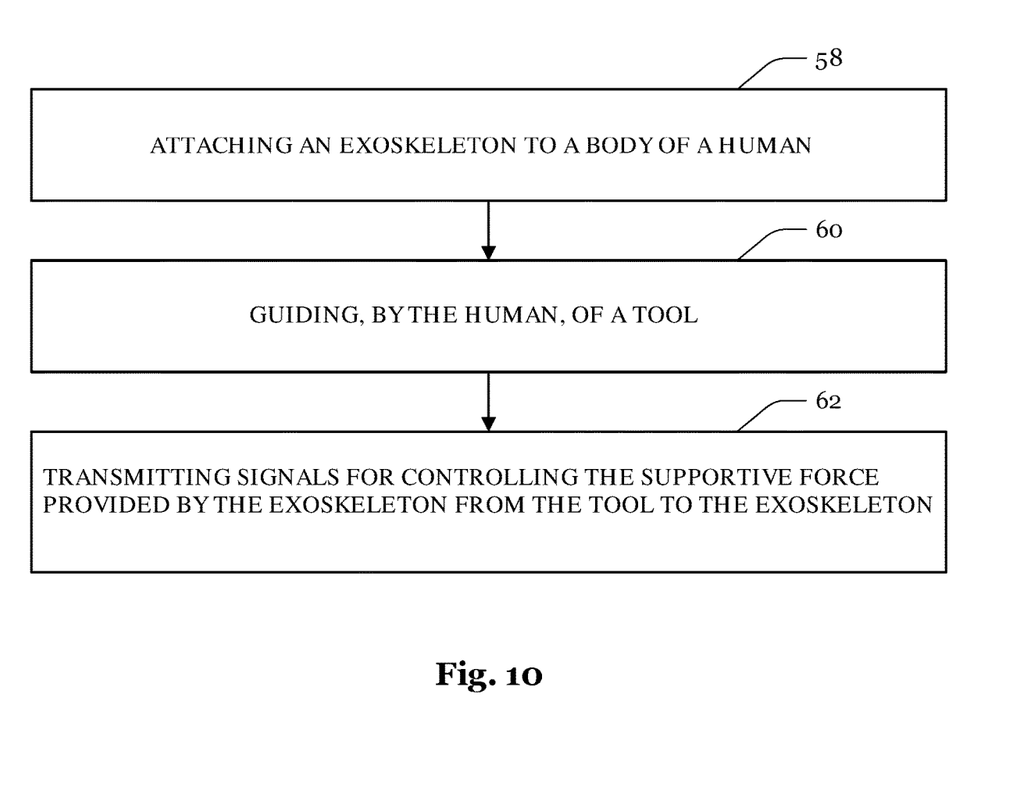
FIG. 10 shows a flowchart of a method according to the invention.

FIG. 10 shows a flowchart of a method according to the invention. The method starts with step 58 of attaching the exoskeleton 12 to the user's body. If the user guides the tool 14 in step 60, signals for controlling the supportive force 48 provided by the exoskeleton 12 are transmitted in step 62 from the tool 14 to the drive control 32 of the exoskeleton 12, which controls the drive or drives 30 taking into account the signals.

Figure 11:
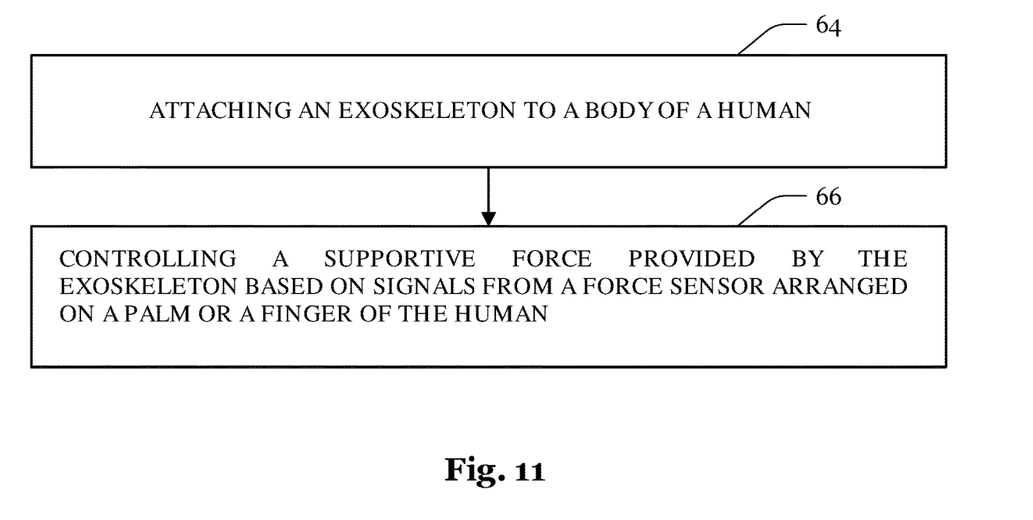
FIG. 11 shows a flow chart of another method according to the invention.

FIG. 11 shows a flow chart of another method according to the invention. The method starts with step 64 of attaching the exoskeleton 12 to the user's body and includes a step 66 of controlling the supportive force 48 provided by the exoskeleton 12 based on signals from a force sensor 36-1 located on a palm or a finger of the human.

LIST OF REFERENCE SIGNS 10 system
12 exoskeleton
14 tool
16 component (exoskeleton)
18 joint (exoskeleton)
20 guide (exoskeleton)
22 base section (exoskeleton)
24 arm section (exoskeleton)
26 shoulder section (exoskeleton)
28 attachment elements (exoskeleton)
30 drive (exoskeleton)
32 drive control (exoskeleton)
34 handle (tool)
36 control unit
36-1 force sensor
38 leg section (exoskeleton)
40 wire
42 antenna
44 control elements (tool)
46 actuating force
48 supportive force
50 sensor unit
52 angle
54 power consumption 56 switch-on signal
58-66 process steps

The invention claimed is:

1. A muscle strength support system, comprising:
an exoskeleton having exoskeleton components that are configured to be attached to a body of a human during use of the system, the exoskeleton further including a drive controlling movement of the exoskeleton and a power supply that powers the drive; and
a tool which is configured to be held in and guided by a hand of the human to act on an object or person during use of the system, the tool including an engine and an energy supply that are independent of the exoskeleton and the drive and the power supply thereof, the engine and the energy supply being used during operation of the tool so that the tool generates a force, the tool being spaced apart from and free of mechanical connections with the exoskeleton during the operation of the tool;
wherein the tool has a control unit separate from the engine and configured for controlling a supportive force provided by the exoskeleton on the human during use of the tool by the human, the supportive force being produced by the drive of the exoskeleton and based on the force generated by the tool.

2. The system according to claim 1, wherein the control unit is connected with a sensor unit disposed on the tool for measuring a relative position of the tool with respect to the exoskeleton; and the supportive force is controlled based on the measured relative position.

3. The system of claim 1, wherein the control unit is configured to control the supportive force while the tool is in use.

4. The system of claim 3, wherein the control unit of the tool comprises a force sensor that is configured to be pressed by the hand of the human during use of the tool, the supportive force being controlled based on measurement values of the force sensor.

5. The system of claim 4, wherein the force sensor is integrated in a button configured to be pressed by the hand of the human and the supportive force is controlled based on measurement values of the force sensor when the button is pressed.

6. The system of claim 1, wherein the control unit is configured to monitor an operating state of the tool and to control the supportive force based on the operating state.

7. The system of claim 6, wherein the control unit is configured to control the supportive force based on a power consumption of the tool.

8. The system of claim 1, wherein the control unit is configured to transmit control signals for controlling the supportive force to the exoskeleton by radio.

9. The system according to claim 1, wherein the exoskeleton is configured to transmit a switch-on signal to the tool if a state of the exoskeleton meets one or more first conditions and/or to transmit a switch-off signal to the tool if the state of the exoskeleton meets one or more second conditions.

10. The system according to claim 1, wherein the control unit is connected with a sensor unit for measuring a position, an orientation, a velocity, and/or an acceleration of the tool in a stationary coordinate system; and the supportive force is controlled based on these measured values.

11. The system according to claim 1, wherein the tool further comprises a handle configured to be held by the hand of the human.

12. The system of claim 6, wherein the control unit is configured to control the supportive force based on the force generated by the tool.

13. The system according to claim 1, wherein the control unit is connected with a sensor unit disposed on the tool for measuring a relative orientation of the tool with respect to the exoskeleton; and the supportive force is controlled based on the measured relative orientation.

14. The system according to claim 1, wherein the control unit is connected with a sensor unit disposed on the tool for measuring a relative velocity of the tool with respect to the exoskeleton; and the supportive force is controlled based on the measured relative velocity.

15. The system according to claim 1, wherein the control unit is connected with a sensor unit disposed on the tool for measuring a relative acceleration of the tool with respect to the exoskeleton; and the supportive force is controlled based on the measured relative acceleration.

16. A method of supporting muscle strength, comprising:
attaching an exoskeleton to a body of a human, the exoskeleton being configured to provide a supportive force to the body of the human, the exoskeleton including a drive controlling movement of the exoskeleton and a power supply that powers the drive;
handling a tool by a hand of the human, the tool including an engine and an energy supply that are independent of the exoskeleton and are used during operation of the tool so that the tool generates a force, the tool being spaced apart from and free of mechanical connections with the exoskeleton; and
transmitting signals from the tool to a drive control or the drive of the exoskeleton so that the signals control the supportive force provided by the exoskeleton on the body of the human, the signals transmitted from the tool being based on the force generated by the tool.

17. The method according to claim 16, further comprising the human using the tool to act on a person or an object independent of the exoskeleton while the signals are transmitted from the tool and the supportive force is provided by the exoskeleton on the body of the human.

* * * * *